(12) United States Patent
Shi et al.

(10) Patent No.: US 11,428,972 B2
(45) Date of Patent: Aug. 30, 2022

(54) DISPLAY PANEL COMPRISING A PLURALITY OF DICHROIC DYE LIQUID CRYSTAL MICROCAPSULES HAVING A QUALITY PERCENTAGE OF LIQUID CRYSTAL MATERIAL OF 95.0%-99.0% AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventors: Zhiqing Shi, Shenzhen (CN); Galatu Suri, Shenzhen (CN); Zhengyu Feng, Shenzhen (CN)

( * ) Notice: Subject to any disclaimer, the term of this patent is extended or adjusted under 35 U.S.C. 154(b) by 442 days.

(21) Appl. No.: 16/626,528

(22) PCT Filed: Nov. 26, 2019

(86) PCT No.: PCT/CN2019/121039
§ 371 (c)(1),
(2) Date: Dec. 25, 2019

(87) PCT Pub. No.: WO2021/088152
PCT Pub. Date: May 14, 2021

(65) Prior Publication Data
US 2021/0363425 A1  Nov. 25, 2021

(30) Foreign Application Priority Data
Nov. 7, 2019 (CN) .......................... 201911080304.2

(51) Int. Cl.
*G02F 1/1333* (2006.01)
*G02F 1/1334* (2006.01)
(Continued)

(52) U.S. Cl.
CPC ...... *G02F 1/133377* (2013.01); *C09K 19/542* (2013.01); *C09K 19/601* (2013.01);
(Continued)

(58) Field of Classification Search
CPC .. C09K 19/601; C09K 19/542; C09K 19/603; C09K 19/605; C09K 2019/523;
(Continued)

(56) References Cited

U.S. PATENT DOCUMENTS 8,420,182 B2 * 4/2013 Jang ..................... C09K 19/544
427/75
8,570,461 B2 * 10/2013 Lee ....................... G02F 1/1334
349/86

(Continued)

FOREIGN PATENT DOCUMENTS

CN 101611117 A 12/2009
CN 102008796 A 4/2011
(Continued)

*Primary Examiner* — Paul C Lee

(57) ABSTRACT

The embodiment of the present invention discloses a display panel, a manufacturing method thereof, and a display device. In the embodiment of the present invention, a liquid crystal layer of the display panel includes a plurality of dichroic dye liquid crystal microcapsules, a dichroic dye in dichroic dye liquid crystal microcapsules can absorb incident light such that when the display panel performs no signal transmission, the dichroic dye polymer network liquid crystal can effectively absorb incident light to lower a dark state transmittance of the display panel to further enhance contrast of the display panel and improve optical characteristics thereof.

12 Claims, 3 Drawing Sheets

(51) Int. Cl.
*C09K 19/54* (2006.01)
*C09K 19/60* (2006.01)

(52) U.S. Cl.
CPC .......... *C09K 19/603* (2013.01); *C09K 19/605* (2013.01); *G02F 1/13345* (2021.01); *G02F 1/133354* (2021.01); *G02F 2202/043* (2013.01)

(58) Field of Classification Search
CPC ........... C09K 2019/546; G02F 1/13345; G02F 2202/043; G02F 2202/04; G02F 1/13737
See application file for complete search history.

(56) References Cited

U.S. PATENT DOCUMENTS

| | | | |
|---|---|---|---|
| 9,772,531 | B2 | 9/2017 | Zhong |
| 10,394,070 | B2 | 8/2019 | Park |
| 2010/0073605 | A1 | 3/2010 | Masutani et al. |
| 2012/0088320 | A1* | 4/2012 | Hwang ............ B29D 11/00788 257/E33.056 |
| 2013/0092874 | A1 | 4/2013 | Bacher |
| 2015/0378189 | A1 | 12/2015 | Kim et al. |
| 2015/0378205 | A1 | 12/2015 | Kim et al. |
| 2016/0026026 | A1* | 1/2016 | Kim .................... G02F 1/13725 349/123 |
| 2016/0115389 | A1 | 4/2016 | Lim et al. |
| 2017/0059916 | A1* | 3/2017 | Park .................. G02F 1/133377 |
| 2017/0210995 | A1* | 7/2017 | Kim .................... G02F 1/1335 |
| 2018/0149908 | A1* | 5/2018 | Park .................... G02F 1/13718 |
| 2018/0373084 | A1 | 12/2018 | Lim et al. |

FOREIGN PATENT DOCUMENTS

| | | | | |
|---|---|---|---|---|
| CN | 102918117 A | | 2/2013 | |
| CN | 103728759 A | | 4/2014 | |
| CN | 104267523 A | * | 1/2015 | ....... G02F 1/133377 |
| CN | 105247013 A | | 1/2016 | |
| CN | 105301852 A | | 2/2016 | |
| CN | 106019681 A | * | 10/2016 | ........... C09K 19/542 |
| CN | 106019681 A | | 10/2016 | |
| CN | 106483723 A | | 3/2017 | |
| CN | 107085327 A | | 8/2017 | |
| CN | 107533266 A | | 1/2018 | |
| CN | 108121100 A | | 6/2018 | |
| CN | 110865496 A | * | 3/2020 | ........... C09K 19/542 |

* cited by examiner

DISPLAY PANEL COMPRISING A PLURALITY OF DICHROIC DYE LIQUID CRYSTAL MICROCAPSULES HAVING A QUALITY PERCENTAGE OF LIQUID CRYSTAL MATERIAL OF 95.0%-99.0% AND DISPLAY DEVICE

The present invention claims the priority of a China patent application No. 201911080304.2 with a subject title of the invention "DISPLAY PANEL, MANUFACTURING METHOD THEREOF, AND DISPLAY DEVICE", which is filed on Nov. 7, 2019 with the China National Intellectual Property Administration (CNIPA), and contents of China patent application are integrated in the present invention by referring thereto.

FIELD OF INVENTION

The present invention relates to a field of display technologies, specifically relates to a display panel, a manufacturing method thereof, and a display device.

BACKGROUND OF INVENTION

At present, more mature transparent display devices are based on traditional liquid crystal display panel technologies. However, due to existence of a polarizer, a transmittance of the display device is limited.

To enhance the transmittance of the transparent display device, polymer network liquid crystal (PNLC) is employed, which achieves variation of a gray scale by variation of the PNLC transmittance under different applied voltages to remove the polarizer and drastically enhance the transmittance of the transparent display device.

SUMMARY OF INVENTION

Technical Issue

The display device removing a polarizer for improvement a transmittance results in drastically lowered contrast in comparison to a traditional liquid crystal display device, which influences an actual application performance.

Technical Solution

The embodiment of the present invention provides a display panel manufacturing method that is configured to solve an issue that polymer network liquid crystal (PNLC) is employed for improving a transmittance of a transparent display device and achieving variation of the gray scale by variation of the transmittance of the PNLC under different voltages to remove a polarizer to drastically increase the transmittance of the transparent display device; however, such technology removing a polarizer for improvement a transmittance results in drastically lowered contrast in comparison to a traditional liquid crystal display device, which influences an actual application performance.

To solve the above issue, in a first aspect, the present invention provides a display panel. Compared to a conventional display panel, the liquid crystal layer of the display panel comprises a plurality of dichroic dye liquid crystal microcapsules, and the dichroic dye in the dichroic dye liquid crystal microcapsules can more effectively absorb incident light such that when no signal is transmitted in the display panel, the dichroic dye polymer network liquid crystal can effectively absorb the incident light, which lowers a dark state transmittance of the display panel and therefore enhances contrast of the display pane to improve optical characteristics thereof.

In one aspect, the present invention provides a display panel, the display panel comprises a first substrate, a second substrate, and a liquid crystal layer, the first substrate and the second substrate are disposed oppositely, the liquid crystal layer is disposed between the first substrate and the second substrate, and the liquid crystal layer comprises a plurality of dichroic dye liquid crystal microcapsules.

Furthermore, the dichroic dye liquid crystal microcapsules comprise a dichroic dye, a liquid crystal material, and comprise a plurality of polymer networks.

Furthermore, the dichroic dye is a single black dichroic dye or a mixture of multiple black dichroic dye.

Furthermore, the dichroic dye comprises at least one of an azo dye, an anthraquinone dye, and an azomethine dye.

Furthermore, in the dichroic dye liquid crystal microcapsules, a quality percentage of the liquid crystal material is 95.0-99.0%.

Furthermore, in the dichroic dye liquid crystal microcapsules, a quality percentage of the dichroic dye is 0.1-5.0%.

Furthermore, in the dichroic dye liquid crystal microcapsules, a quality percentage of the polymer networks is 0.3-0.5%.

Furthermore, the polymer networks comprise at least one of acrylate, acrylate derivative, methyl acrylate, methyl acrylate derivative, phenylethene, phenylethene derivative, and epoxy resin.

In a second aspect, the present invention provides a display device, the display device comprises a display panel, the display panel comprises a first substrate, a second substrate, and a liquid crystal layer, the first substrate and the second substrate are disposed oppositely, the liquid crystal layer is disposed between the first substrate and the second substrate, and the liquid crystal layer comprises a plurality of dichroic dye liquid crystal microcapsules.

Furthermore, the dichroic dye liquid crystal microcapsules comprise a dichroic dye, a liquid crystal material, and comprise a plurality of polymer networks.

Furthermore, the dichroic dye is a single black dichroic dye or a mixture of multiple black dichroic dyes.

Furthermore, the dichroic dye comprises at least one of an azo dye, an anthraquinone dye, and an azomethine dye.

Furthermore, in the dichroic dye liquid crystal microcapsules, a quality percentage of the liquid crystal material is 95.0-99.0%.

Furthermore, in the dichroic dye liquid crystal microcapsules, a quality percentage of the dichroic dye is 0.1-5.0%.

Furthermore, in the dichroic dye liquid crystal microcapsules, a quality percentage of the polymer networks is 0.3-0.5%.

Furthermore, the polymer networks comprise at least one of acrylate, acrylate derivative, methyl acrylate, methyl acrylate derivative, phenylethene, phenylethene derivative, and epoxy resin.

In the aspect of cooperation manufacturers, the present invention provides a display panel manufacturing method, the method comprises:

providing a first substrate and a second substrate;

manufacturing a liquid crystal layer on the first substrate, wherein the liquid crystal layer comprises dichroic dye liquid crystal microcapsules;

aligning the second substrate with the first substrate; and curing the liquid crystal layer to acquire a display panel.

Advantages

The embodiment of the present invention provides a display panel, the display panel comprises a first substrate, a second substrate, and a liquid crystal layer, the first substrate and the second substrate are disposed oppositely, the liquid crystal layer is disposed between the first substrate and the second substrate, and the liquid crystal layer comprises a plurality of dichroic dye liquid crystal microcapsules. Compared to a conventional display panel, the liquid crystal layer of the display panel comprises a plurality of dichroic dye liquid crystal microcapsules, and the dichroic dye in the dichroic dye liquid crystal microcapsules can more effectively absorb incident light such that when no signal is transmitted in the display panel, the dichroic dye polymer network liquid crystal can effectively absorb the incident light, which lowers a dark state transmittance of the display panel and therefore enhances contrast of the display pane to improve optical characteristics thereof.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
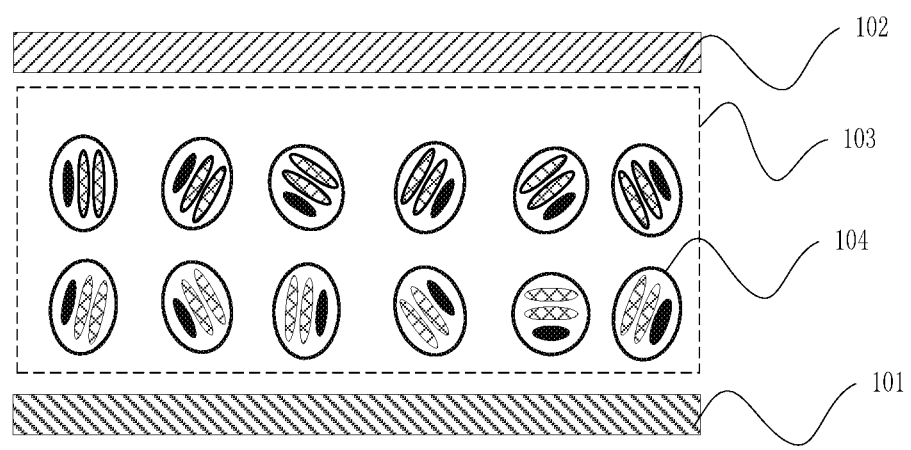
FIG. 1 is a schematic structural view of an embodiment of a display panel provided by an embodiment of the present invention.

The technical solution in the embodiment of the present invention will be clearly and completely described below with reference to the accompanying drawings in the embodiments of the present invention. Apparently, the described embodiments are merely some embodiments of the present invention instead of all embodiments. According to the embodiments in the present invention, all other embodiments obtained by those skilled in the art without making any creative effort shall fall within the protection scope of the present invention.

In the description of the present invention, it should be understood that terminologies "center", "longitudinal", "transverse", "length", "width", "thickness", "upper", "lower", "front", "rear", "left", "side", "vertical", "horizontal", "top", "bottom", "inner", "outer", "clockwise", "counterclockwise" for indicating relations of orientation or position are based on orientation or position of the accompanying drawings, are only for the purposes of facilitating description of the present invention and simplifying the description instead of indicating or implying that the referred device or element must have a specific orientation or position, must to be structured and operated with the specific orientation or position. Therefore, they should not be understood as limitations to the present invention. Furthermore, terminologies "first", "second" are only for the purposes of description, and cannot be understood as indication or implication of comparative importance or a number of technical features. Therefore, a feature limited with "first", "second" can expressly or implicitly include one or more features. In the description of the present invention, a meaning of "a plurality of" is two or more, unless there is a clear and specific limitation otherwise.

At present, more mature transparent display devices are based on traditional liquid crystal display panel technologies. However, due to existence of a polarizer, a transmittance of the display device is limited Polymer network liquid crystal (PNLC) is employed for improving a transmittance of a transparent display device and achieving variation of the gray scale by variation of the transmittance of the PNLC under different voltages to remove a polarizer to drastically increase the transmittance of the transparent display device; however, such technology removing a polarizer for improvement a transmittance results in drastically lowered contrast in comparison to a traditional liquid crystal display device, which influences an actual application performance.

As described above, the embodiment of the present invention provides a display panel, a manufacturing method thereof, and a display device, which will be described separately.

First, the embodiment of the present invention provides a display panel, the display panel comprises a first substrate, a second substrate, and a liquid crystal layer. The first substrate and the second substrate are disposed oppositely, the liquid crystal layer are disposed between the first substrate and the second substrate. The liquid crystal layer comprises a plurality of dichroic dye liquid crystal microcapsules.

With reference to FIG. 1, FIG. 1 is a schematic structural view of an embodiment of a display panel provided by an embodiment of the present invention. The display panel comprises a first substrate 101, a second substrate 102, and a liquid crystal layer 103. The first substrate and the second substrate are disposed oppositely. The liquid crystal layer is disposed between the first substrate and the second substrate. The liquid crystal layer comprises a plurality of dichroic dye liquid crystal microcapsules 104.

Specifically, the FIG. 1 shows that the display panel is not in a signal transmission status, the liquid crystal material is in an irregular status. When a light absorbing axis of the dichroic dye is parallel to a polarizing direction of a normal light, the dichroic dye extremely absorbs light to reduce a dark state transmittance of the display panel.

The embodiment of the present invention provides a display panel, and the display panel comprises: a first substrate, a second substrate, and a liquid crystal layer. The first substrate and the second substrate are disposed oppositely. The liquid crystal layer is disposed between the first substrate and the second substrate. The liquid crystal layer comprises a plurality of dichroic dye liquid crystal microcapsules 104. Compared to the conventional display panel, the liquid crystal layer in the display panel comprises a plurality of dichroic dye liquid crystal microcapsules 104. A dichroic dye in the dichroic dye liquid crystal microcapsules 104 can more effectively absorb incident light such that the dichroic dye polymer network liquid crystal can better absorb incident light when the display panel performs no signal transmission. Therefore, the dark state transmittance of the display panel is lowered to enhance contrast of the display panel and improve optical performance thereof.

Figure 2:
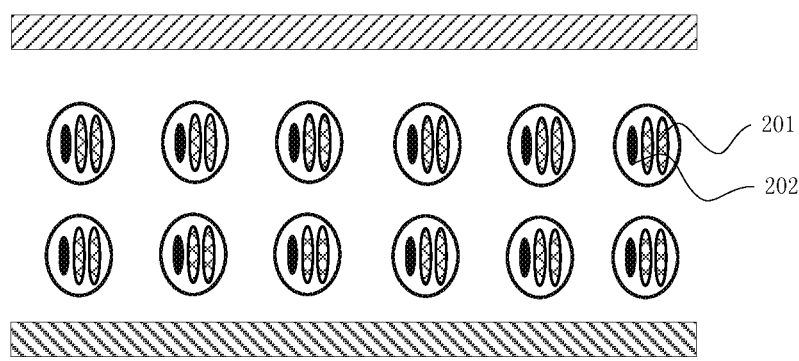
FIG. 2 is a schematic structural view of a display panel provided by the embodiment of the present invention implementing signal transmission.
Figure 3:
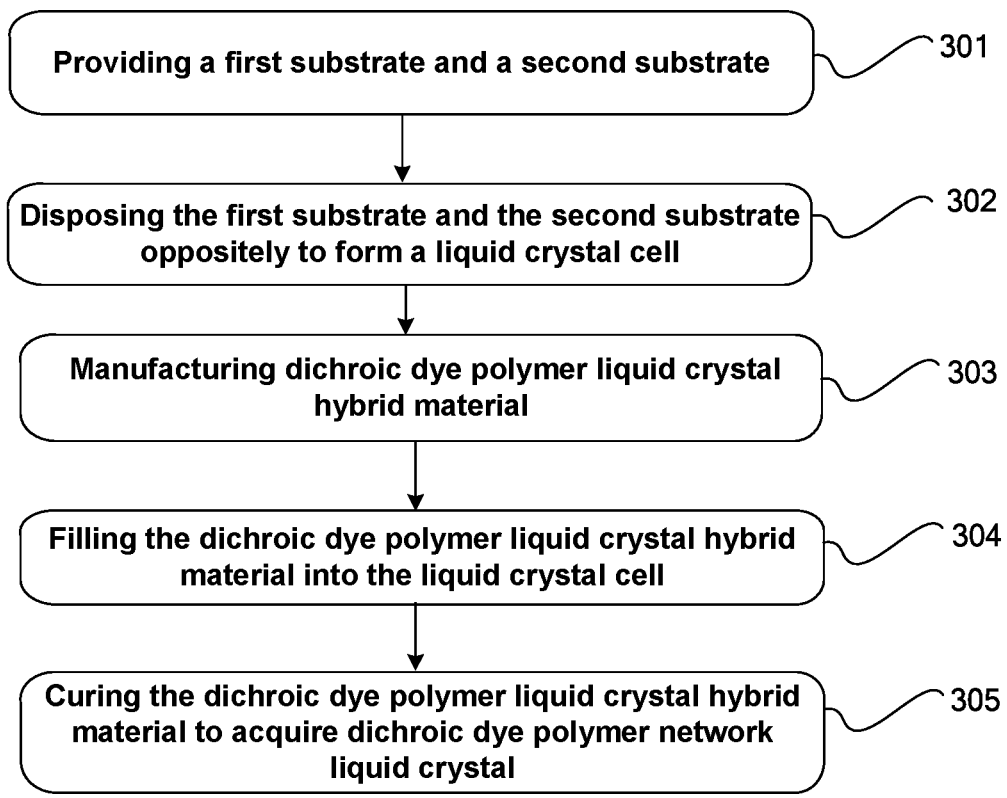
FIG. 3 is a schematic flowchart of a display panel manufacturing method provided by the embodiment of the present invention.

With reference to FIGS. 1 and 2, FIG. 2 is a schematic structural view of a display panel provided by the embodiment of the present invention implementing signal transmission. Specifically, each of the dichroic dye liquid crystal microcapsules comprises liquid crystal material 201 and dichroic soft molecules 202. When the display panel is in a status of performing signal transmission, the dichroic dye molecules 202 would rotate according to the liquid crystal material 201, and a light absorbing axis of the dichroic dye molecules 202 is perpendicular to a polarizing direction of a normal light. In the meantime, light absorption ability of the dichroic dye molecules becomes weak, and it has little influence to bright status transmittance of the display panel.

The present invention display panel, by using the dichroic dye polymer network liquid crystal of the embodiment as described above, increases the light absorbing characteristics of the polymer network liquid crystal by adding the dichroic dye molecules with a characteristic of rotating according to the liquid crystal material, which improves insufficient darkness of the dark state thereof and further improves contrast of the display panel.

The display panel can be a transparent display panel, and the embodiment of the present invention can provide a transparent display panel. Because the dichroic dye and the liquid crystal material are both wrapped in the polymer networks such that when the display panel performs the signal transmission, the dichroic dye polymer network liquid crystal can better absorb incident light to lower a dark state transmittance of the display panel to improve contrast of the display panel and enhance the optical characteristics.

On the basis of the above embodiment, in another specific embodiment of the present invention, the dichroic dye liquid crystal microcapsules 104 comprises dichroic dye, liquid crystal material and comprises a plurality of polymer networks.

To better mix the dichroic dye and liquid crystal material, an organic solvent should be added to effectively distribute the dichroic dye in the mixture liquid. The embodiment of the present invention has no limitation to the organic solvent, I, and it depends on actual situations. For example, the organic solvent can be phenylethene, perchloroethylene, trichloroethylene, ethylene glycol monovinyl ether, and triethanolamine.

Specifically, the liquid crystal material with a quality percentage of 96.5% and the dichroic dye with a quality percentage of 2.5% an be used for mixture in a container, and the container can be vibrated to fully mix the liquid crystal material and the dichroic dye.

Generally, application of the polymer network liquid crystal (PNLC) is being researched constantly, under the circumstance of no applied voltage, axes of the liquid crystal material are disordered in any directions. Incident light after entering the polymer network liquid crystal layer generates refracted light of different directions such that a light scattering phenomenon occurs to make the screen opaque. When a voltage is applied, axes of the liquid crystal material are arranged in order along a direction of the electrical field. The incident light after entering the polymer network liquid crystal layer can move forward along the regularly arranged liquid crystal material, and extend through the polymer network liquid crystal layer such that the screen becomes transparent. In the embodiment of the present invention, by using the polymer network liquid crystal, the dichroic dye and the liquid crystal material are both wrapped in the polymer networks to form dichroic dye polymer network liquid crystal such that when the display panel performs no signal transmission, the dichroic dye polymer network liquid crystal can better absorb incident light to lower a dark state transmittance of the display panel to further improve contrast of the display panel and enhance the optical characteristics thereof.

On the basis of the above embodiment, in another specific embodiment of the present invention, the dichroic dye is a single black dichroic dye or a mixture of multiple black dichroic dyes.

The dichroic dye has no characteristics of an electrode, and therefore moves according to movement of the liquid crystal material. Furthermore, the dichroic dye is configured to absorb light, and a visible light absorbing spectrum of the dichroic dye is from 400 to 780 nm.

On the basis of the above embodiment, in another specific embodiment of the present invention, the dichroic dye comprises at least one of an azo dye, an anthraquinone dye, and an azomethine dye. For example, the dichroic dye is a mixture of the azo dye and the anthraquinone dye.

On the basis of the above embodiment, in a specific embodiment of the present invention, in the dichroic dye liquid crystal microcapsules 104, a quality percentage of the liquid crystal material is 95.0-99.0%. For example, a quality percentage of the liquid crystal material is 96.5%. Specifically, the present invention has no limitation to a specific value of a quality percentage of the liquid crystal material, and it depends on actual situations.

On the basis of the above embodiment, in a specific embodiment of the present invention, in the dichroic dye liquid crystal microcapsules 104, a quality percentage of the dichroic dye is 0.1-5.0%. For example, a quality percentage of the dichroic dye is 2.5%. Specifically, the present invention has no limitation to a specific value of a quality percentage of the dichroic dye, and it depends on actual situations.

On the basis of the above embodiment, in a specific embodiment of the present invention, in the dichroic dye liquid crystal microcapsules 104, a quality percentage of the polymer networks is 0.3-0.5%. For example, a quality percentage of the polymer networks is 0.38%. Specifically, the present invention has no limitation to a specific value of a quality percentage of the polymer networks, and it depends on actual situations.

On the basis of the above embodiment, in a specific embodiment of the present invention, the polymer networks can comprise at least one of acrylate, acrylate derivative, methyl acrylate, methyl acrylate derivative, phenylethene, phenylethene derivative, and epoxy resin. For example, the polymer networks is a mixture of acrylate derivative and methyl acrylate.

Specifically, the embodiment of the present invention has no limitation to types of the polymer networks, and it depends on actual situations.

To better embody the embodiment of the display panel of the present invention, on the basis of the display panel, the embodiment of the present invention also provides a display device, the display device comprises the display panel of the above embodiment.

The embodiment of the present invention, by using the display panel of the above embodiment, has high contrast performance when compared to a conventional display device.

To better embody the embodiment of the display panel of the present invention, on the basis of the display panel, the embodiment of the present invention also provides a display panel manufacturing method, the method comprises steps 301 to 304 as follows.

The step 301 comprises providing a first substrate and a second substrate.

In the present embodiment, the first substrate can be a thin film transistor array substrate, and the second substrate can be a color substrate.

The step 302 comprises manufacturing a liquid crystal layer on the first substrate. The liquid crystal layer comprises dichroic dye liquid crystal microcapsules.

The step 303 comprises aligning the second substrate with the first substrate.

In the present embodiment, a cross-section of the color substrate and a cross-section of the thin film transistor array substrate are disposed oppositely, and three edges of the substrates are sealed by a frame sealant to form a cell that can be close.

The step 304 comprises curing the liquid crystal layer to acquire a display panel.

In the present embodiment, the curing method is irradiating the dichroic dye liquid crystal microcapsules 104 with ultraviolet, to acquire dichroic dye polymer network liquid crystal. A wavelength of the ultraviolet is 250 nm to 400 nm. The ultraviolet-curing employs photosensitivity of a photoinitiator (photosensitizer), and under ultraviolet irradiation molecules of an excited state are formed and decomposed to radicals or ions such that unsaturated organic compounds are chemically polymerized, grafted, and crosslinked to achieve an objective of curing.

The embodiment of the present invention, by providing a display panel manufacturing method comprising: providing a first substrate and a second substrate; manufacturing a liquid crystal layer on the first substrate with the liquid crystal layer comprising dichroic dye liquid crystal microcapsules 104; aligning the second substrate with the first substrate; curing the liquid crystal layer to acquire a display panel. Compared to a conventional display panel, the liquid crystal layer of the display panel comprises a plurality of dichroic dye liquid crystal microcapsules 104, and the dichroic dye in the dichroic dye liquid crystal microcapsules 104 can more effectively absorb incident light such that when no signal is transmitted in the display panel, the dichroic dye polymer network liquid crystal can effectively absorb the incident light, which lowers a dark state transmittance of the display panel and therefore enhances contrast of the display pane to improve optical characteristics thereof.

In the above-mentioned embodiments, the descriptions of the various embodiments are focused. For the details of the embodiments not described, reference may be made to the related descriptions of the other embodiments.

In the specific implementation, each of the above units or structures may be implemented as a separate entity, or may be any combination, and implemented as the same entity or a plurality of entities. The specific implementation of the above units or structures refer to the previous method embodiment and will not be described repeatedly.

The specific embodiment of each of the above operations can refer to the former embodiments and will not be described repeatedly herein.

As describe above, a display panel, a manufacturing method thereof, and a display device of the embodiment of the present invention are introduced in details. In the specification, the specific examples are used to explain the principle and embodiment of the present invention. The above description of the embodiments is only used to help understand the method of the present invention and its spiritual idea. Meanwhile, for those skilled in the art, according to the present the idea of invention, changes will be made in specific embodiment and application. In summary, the contents of this specification should not be construed as limiting the present invention.

What is claimed is:

1. A display panel, wherein the display panel comprises a first substrate, a second substrate, and a liquid crystal layer, the first substrate and the second substrate are disposed oppositely, the liquid crystal layer is disposed between the first substrate and the second substrate, and the liquid crystal layer comprises a plurality of dichroic dye liquid crystal microcapsules;
   wherein the dichroic dye liquid crystal microcapsules comprise a dichroic dye, a liquid crystal material, and comprise a plurality of polymer networks;
   wherein in the dichroic dye liquid crystal microcapsules, a quality percentage of the liquid crystal material is 95.0-99.0%.

2. The display panel as claimed in claim 1, wherein the dichroic dye is a single black dichroic dye or a mixture of multiple black dichroic dyes.

3. The display panel as claimed in claim 1, wherein the dichroic dye comprises at least one of an azo dye, an anthraquinone dye, and an azomethine dye.

4. The display panel as claimed in claim 1, wherein in the dichroic dye liquid crystal microcapsules, a quality percentage of the dichroic dye is 0.1-5.0%.

5. The display panel as claimed in claim 1, wherein in the dichroic dye liquid crystal microcapsules, a quality percentage of the polymer networks is 0.3-0.5%.

6. The display panel as claimed in claim 1, wherein the polymer networks comprise at least one of acrylate, acrylate derivative, methyl acrylate, methyl acrylate derivative, phenylethene, phenylethene derivative, and epoxy resin.

7. A display device, wherein the display device comprises a display panel, the display panel comprises a first substrate, a second substrate, and a liquid crystal layer, the first substrate and the second substrate are disposed oppositely, the liquid crystal layer is disposed between the first substrate and the second substrate, and the liquid crystal layer comprises a plurality of dichroic dye liquid crystal microcapsules;
   wherein the dichroic dye liquid crystal microcapsules comprise a dichroic dye, a liquid crystal material, and comprise a plurality of polymer networks;
   wherein in the dichroic dye liquid crystal microcapsules, a quality percentage of the liquid crystal material is 95.0-99.0%.

8. The display device as claimed in claim 7, wherein the dichroic dye is a single black dichroic dye or a mixture of multiple black dichroic dyes.

9. The display device as claimed in claim 7, wherein the dichroic dye comprises at least one of an azo dye, an anthraquinone dye, and an azomethine dye.

10. The display device as claimed in claim 7, wherein in the dichroic dye liquid crystal microcapsules, a quality percentage of the dichroic dye is 0.1-5.0%.

11. The display device as claimed in claim 7, wherein in the dichroic dye liquid crystal microcapsules, a quality percentage of the polymer networks is 0.3-0.5%.

12. The display device as claimed in claim 7, wherein the polymer networks comprise at least one of acrylate, acrylate derivative, methyl acrylate, methyl acrylate derivative, phenylethene, phenylethene derivative, and epoxy resin.

* * * * *